(12) United States Patent
Robling et al.

(10) Patent No.: US 7,264,216 B1
(45) Date of Patent: Sep. 4, 2007

(54) TILT-BACK TRIANGULAR SUPPORTS FOR SPEAKER AND AMPLIFIER CABINETS

(76) Inventors: Jason O. Robling, 561 Primus Ct., Frederick, MD (US) 21703; Thomas S. Rotella, 17711 Cricket Hill Dr., Germantown, MD (US) 20874

( * ) Notice: Subject to any disclaimer, the term of this patent is extended or adjusted under 35 U.S.C. 154(b) by 182 days.

(21) Appl. No.: 11/036,387

(22) Filed: Jan. 18, 2005

Related U.S. Application Data

(60) Provisional application No. 60/549,915, filed on Mar. 5, 2004.

(51) Int. Cl.
A47G 1/24 (2006.01)
(52) U.S. Cl. ............... 248/456; 248/454; 248/455; 248/457; 248/127; 248/676
(58) Field of Classification Search ........... 248/127, 248/454–457, 676
See application file for complete search history.

(56) References Cited

U.S. PATENT DOCUMENTS

| | | | | |
|---|---|---|---|---|
| 308,535 | A | * | 11/1884 | Vail ............................ 248/463 |
| 1,581,742 | A | * | 4/1926 | Johnson ...................... 248/464 |
| 2,714,904 | A | | 8/1955 | Bolton |
| 2,744,712 | A | * | 5/1956 | Brandt ........................ 248/451 |
| 3,145,014 | A | * | 8/1964 | Neuwirth ..................... 248/464 |
| 3,201,080 | A | * | 8/1965 | Orback ........................ 248/460 |
| 3,981,522 | A | * | 9/1976 | Bloom ......................... 281/34 |
| 4,355,779 | A | * | 10/1982 | Heled .......................... 248/460 |
| 4,943,021 | A | * | 7/1990 | Cien et al. .................... 248/167 |
| 5,145,133 | A | * | 9/1992 | France ......................... 248/168 |
| 5,161,771 | A | * | 11/1992 | Domeier ...................... 248/676 |
| 5,497,971 | A | * | 3/1996 | Spiro .......................... 248/455 |
| 5,720,465 | A | * | 2/1998 | Peltzer et al. ................ 248/453 |
| 5,722,628 | A | * | 3/1998 | Menaged .................... 248/441.1 |
| 6,135,413 | A | * | 10/2000 | Glebe ......................... 248/441.1 |
| 6,145,801 | A | * | 11/2000 | Herring, Jr. ................. 248/463 |
| 6,152,417 | A | * | 11/2000 | Randall ....................... 248/460 |
| 6,196,512 | B1 | * | 3/2001 | Ure ............................. 248/464 |
| 6,260,812 | B1 | | 7/2001 | Auke |
| 6,270,049 | B1 | * | 8/2001 | Olvey ......................... 248/441.1 |
| 6,435,466 | B1 | * | 8/2002 | Adams ........................ 248/455 |
| 2002/0043544 | A1 | * | 4/2002 | Caneba ........................ 224/584 |

* cited by examiner

*Primary Examiner*—Carl D. Friedman
*Assistant Examiner*—Michael McDuffie
(74) *Attorney, Agent, or Firm*—Rothwell, Figg, Ernst & Manbeck, PC

(57) ABSTRACT

The present invention is a rigid or collapsible folding stand for a high fidelity amplifier or speaker. In general, the amplifier or speaker has a rear base edge placed on a two or more flexible straps. The amplifier or speaker is then tilted backward until it touches the amplifier or speaker stand at a single point. The rear surface of the amplifier or speaker, supporting legs and one or more lower flexible straps form a triangle that supports the amplifier or speaker. The stand holds the amplifier in an adjustably tilted position that is controlled by the length of the supporting legs and/or flexible straps used.

19 Claims, 8 Drawing Sheets

TILT-BACK TRIANGULAR SUPPORTS FOR SPEAKER AND AMPLIFIER CABINETS

This application claims the benefit of U.S. Provisional Patent Application No. 60/549,915, filed Mar. 5, 2004.

BACKGROUND OF THE INVENTION

Musicians often require the use of small, portable amplifiers and speakers when playing certain musical instruments. Amplifiers and speakers are needed to enhance the musical performance for larger events. Devices such as amplifiers and speakers generally deliver output through the front face of the devices. In order for a musician to obtain the ideal acoustical effects from the devices, the housings are usually tilted backward to project sound upward and outward. The angle of the devices must be adjusted depending on each individual circumstance. Current methods of setting up amplifiers and speakers require bulky devices that are expensive, difficult to carry.

Needs exist for improved devices for orienting portable amplifiers and speakers that are easy to carry and minimize effort during set up and take down.

SUMMARY OF THE INVENTION

The present invention is a rigid or collapsible folding stand for a high fidelity amplifier or speaker. In general, the amplifier or speaker has a rear base edge placed on a two or more flexible straps. The amplifier or speaker is then tilted backward until it touches the amplifier or speaker stand at a single point. The rear surface of the amplifier or speaker, supporting legs and one or more lower flexible straps form a triangle that supports the amplifier or speaker. The stand holds the amplifier in an adjustably tilted position that is controlled by the length of the supporting legs and/or flexible straps used.

A musician first provides an amplifier or speaker cabinet that needs to be positioned.

In a first embodiment, the first pieces of the amplifier or speaker stand are first and second supporting legs. A hinge connects the first and second supporting legs. The hinge allows the first and second supporting legs to move with respect to one another around the hinge point in parallel planes.

An extension may be included on either the first or second supporting legs. The extension is covered by a cap that covers all or part of the extension. Additionally, a slot is created that passes through the extension and the cap. The cap may be made of rubber or a similar substance that protects the surface of the amplifier or speaker. The extension also has one or more posts attached on the rear surface of the extension. The rear surfaces of all parts face away from the amplifier or speaker. Alternatively, the posts may be excluded and the hinge may be extended outward from the rear of the supporting legs to form a post. One or more posts are also included at each end of the first and second supporting legs furthest from the hinge.

The second part of the amplifier or speaker stand is a horizontal base bar. The horizontal base bar creates a base for the stand along the floor or other surface that holds the amplifier or speaker. The horizontal base bar has one or more cutouts on each opposite ends for receiving the posts on the ends of the first and second supporting legs. The cutouts are generally circular in shape with an additional, narrower, protruding cutout that extends toward the ends of the horizontal base bar. The posts from the supporting legs pass through the wider circular openings and then lock into the narrower, protruding cutouts. The weight of the amplifier or speaker on the supporting legs prevents the posts from leaving the narrower, protruding cutouts.

The horizontal base bar also has a post at the center of the rear surface. There may also be a cutout underneath the central post to allow a flexible strap to pass under the horizontal base bar before attaching to the central post. This allows the horizontal base bar to sit flush with the floor or other surface that the amplifier or speaker is resting on. The notch prevents the amplifier or speaker stand from wobbling and potentially damaging the amplifier or speaker.

When the first and second supporting legs and the horizontal base bar are connected, these pieces form a rigid triangular support system. Inserting different posts into different cutouts may modify the size and configuration of the triangular support. As an additional security feature, one or more post locks may be attached to both ends of a front surface of the horizontal base bar. The post locks are straps with one or more holes at the end not attached to the front surface of the horizontal base bar. The straps may be made of polypropylene or a similar material. The ends of the post locks are wrapped around the closest end of the horizontal base bar and attach to the posts on the ends of the first or second supporting legs after the posts on the first or second supporting legs pass through the cutouts on the horizontal base bar. The post locks further prevent movement of the posts in the cutouts by securing them in the narrower, protruding cutouts.

A third part to the amplifier or speaker stand is a stop. The stop may be made out of hard, foam rubber, neoprene or a similar substance. Preferably, the stop is a block, wedge or a cylinder. Lower straps extend from the bottom of the block. The top strap is wrapped around the end of the block. These straps may be made of polypropylene or a similar material. One or more holes or snap fasteners are mounted in the free ends of the straps not connected to the stop. The series of holes or fasteners makes the system adjustable to various amplifier or speaker dimensions and setup conditions.

All three elements of the amplifier or speaker stand work together to provide a stable, collapsible stand. First, the stop and corresponding straps are placed on the floor or other surface that will hold the amplifier or speaker. The upper and lower straps are fully extended on the surface toward where the rear surface of the amplifier or speaker will be. If a wedge is used, the thickest surface of the wedge will face in the same direction as the front surface of the amplifier or speaker. The amplifier or speaker is then placed on the extended straps. The rear base edge of the amplifier or speaker is placed on the straps close to the connection between the stop and the straps. The amplifier or speaker is tilted backward to accomplish this.

The supporting legs are then rotated along the hinge until the desired separation between the legs is achieved. The legs are then attached to the horizontal base bar and locked into place. The completed rear triangle of the stand is then placed behind the backward tilted amplifier or speaker so that the rubber cap on the extension is touching the rear surface of the amplifier or speaker.

Next, the upper strap is passed along the rear surface of the amplifier or speaker and through the slot in the extension. The upper strap is then attached to the supporting legs by sliding one of the holes on the strap onto the one or more posts or onto the extended hinge. The lower strap is then run along the floor or other surface and under the notch in the horizontal base bar. The lower strap is then raised up so that one of the holes on the lower strap fits over the central post on the horizontal base bar. This completes the construction of the amplifier or speaker stand.

In order to further adjust the amplifier or speaker stand for different sized amplifiers or speakers or for various operating conditions, leg extensions for the first and second supporting legs may be used. The leg extensions have one or more cutouts along the length of the leg extensions. The cutouts on the leg extensions are similar to those on the horizontal base bar. The narrower, protruding cutouts extend away from one or more posts at an end of the leg extensions. The leg extensions first attach to the first and second supporting legs. They are attached by passing the one or more end posts on the supporting legs through the cutouts on the leg extensions and locking the posts into the narrower, protruding cutouts. Then, the one or more posts on the leg extensions pass through the one or more cutouts on the horizontal base bar and lock into place in a manner similar to the original supporting legs locking into the cutouts.

This flexibility allows the amplifier or speaker stand to be adjustable to accommodate a wide range or amplifier or speaker sizes and positions.

Other embodiments for the amplifier or speaker stand of the present invention are possible. A stand can include a base member and a first and second side members. Strap attachments are found on the center of a rear surface of the base member and on the first or second side member near where the side members connect. A hinge on an end of the base member connects the end of the base member to an end of the first side member. Another hinge on an opposite end of the first side member connects the opposite end of the first side member to an end of the second side member. Finally, a fastener on an opposite end of the second side member connects the opposite end of the second side member to an opposite end of the base member.

Similar to the previous embodiment, a stop is used to complete the amplifier or speaker stand. Upper and lower straps extend from the stop. The upper strap is connected to the strap attachment on the opposite end of the first side member, and the lower strap is connected to the strap attachment in the center of the rear surface of the base member.

To use the apparatus, a rear base edge of an amplifier or speaker is placed on the straps in proximity to the stop. Then a rear surface of the amplifier or speaker is placed in contact with the hinge between the first and second side members.

This embodiment folds up for easy carrying and storage of the amplifier or speaker stand. The base member has a flange for preventing rotation of the first side member during folding in an undesired direction. The first side member may include a notch for receiving the strap attachment on the center of the rear surface of the base member during folding. This allows the base member to fold snug with the first side member. The size of the stand is adjustable to accommodate a wide variety of amplifier or speaker sizes and positions.

The hinge and the strap attachments on the opposite end of the first side member may be combined into one dual function device. Additionally, the fastener on an opposite end of the second side member may be a snap, turn button or other attachment device. Alternatively, the fastener is a leaf spring mechanism on the second side member and corresponding socket holes on the base member.

An alternative embodiment for a stand includes a base member and a vertical member connected to the center of a rear surface of the base member. Strap attachments are placed on the connection between the vertical member and the center of the rear surface of the base member and a top end of the vertical member. Like the previous embodiments, a stop is used to complete the amplifier or speaker stand. Upper and lower straps extend from the stop. The upper strap is connected to the strap attachment on the opposite end of the first side member, and the lower strap is connected to the strap attachment in the center of the rear surface of the base member.

To use the apparatus, a rear base edge of an amplifier or speaker is placed on the straps in proximity to the stop. Then a rear surface of the amplifier or speaker is placed in contact with the end of the vertical member.

This embodiment folds up for easy carrying and storage of the amplifier or speaker stand. The base member may be split into two segments and wherein each segment is connected to the central vertical member by a hinge. Each segment of the base member folds up to abut the vertical member, thereby forming a highly portable device. The segments of the base member lock into place during carrying and storage.

The vertical member may be adjustable. The vertical member comprises a smaller first segment movable in relation to a larger second section. The first and second segments are connected together using an adjustable locking mechanism.

Another embodiment of the stand uses first and second segments of a base member and first and second side members. A hinge is provided between the first and second segments of a base member for forming a collapsing hinge. Hinges are also located on ends of the segments of the base member opposite the collapsing hinge for connecting the ends of the base member to ends of the first and second side members, as well as on an opposite end of the first side member and an opposite end of the second side member for connecting the first side member to the second side member. Strap attachments are located on the rear surface of the base member and on the opposite end of the first side member.

Similar to the previous embodiments, a stop is used to complete the amplifier or speaker stand. Upper and lower straps extend from the stop. The upper strap is connected to the strap attachment on the opposite end of the first side member, and the lower strap is connected to the strap attachment in the center of the rear surface of the base member.

To use the apparatus, a rear base edge of an amplifier or speaker is placed on the straps in proximity to the stop. Then a rear surface of the amplifier or speaker is placed in contact with the hinge between the first and second side members.

This embodiment has a retainer clip for holding the first and second segments of the base member in a straight line during use. It also has a locking ring for securing the first and second segments of the base member in a straight line. When use of the stand is completed, the collapsing hinge is pushed upward, folding the segments of the base member under the side members.

The hinge and the strap attachments on the opposite end of the first side member may be combined into one dual function device. The stand dimensions are adjustable to accommodate a wide range or amplifier or speaker sizes and positions.

In an alternative embodiment, a stand can include a base member and a first and second side members. Strap attachments are found on either end of the base member and on the connection between the first and second side member at the attachment point. First and second hinges on either end of the base member connect the ends of the base member to a lower end of the first side member and the second side member. The first and second hinges allow for the first side member to rotate in front of the base member and the second side member to rotate behind the base member. The first and second hinges also act as snap attachments. A turn button fastener device is located on the upper ends of the first and second side members. The turn button fastener has a pass-through extension on the side member closest to the amplifier or speaker and a pass-through opening on the side member furthest from the amplifier or speaker. The pass through extension has a turn button on the end that rotates after the extension is passed through the opening to secure the stand in a locked position.

In one embodiment, complementary snaps on upper ends of the side members hold the upper ends together. Snaps on the free end of the upper strap connect with complementary snaps on upper ends of the side members. Similar to the previous embodiments, a stop is used to complete the amplifier or speaker stand. The stop may be made of foam or any other material. An upper strap extends from the top of the stop. The straps are preferably, but not limited to, flexible or polypropylene straps. The upper strap is riveted or otherwise attached to the stop at one end. The opposite end has one or more eyelets corresponding in size to the pass-through opening. The pass-through extension also passes through the eyelet before the turn button is secured. The rivets are preferably, but not limited to metal eyelets. Multiple eyelets allow for adjustment of the upper strap to accommodate different sized amplifiers or speakers and angles of amplifiers or speakers.

Two lower straps, or one folded strap, extend from the stop. One strap is place over the other before being riveted or otherwise attached to the stop. The same rivet or attachment may connect both the lower straps and the upper strap to the stop. One lower strap extends to the snap hinge device connecting the first side member to the base member. A snap on the free end of the lower strap connects to a complementary snap on the hinge. The other lower strap extends to the snap hinge device connecting the second side member to the base member. A snap on the free end of this lower strap connects to a complementary snap on the hinge.

To use the apparatus, a rear base edge of an amplifier or speaker is placed on the straps in proximity to the stop. Then a rear surface of the amplifier or speaker is placed in contact with the connection area of the first and second side members. This embodiment folds up for easy carrying and storage of the amplifier or speaker stand.

In another embodiment, the triangular shape created by a base member and first and second side members may be fixed. The amplifier or speaker stand is still portable and easy to use. One or more straps connect a stop to the triangular shape. The straps may be removed during transport to create a compact device or they may be left attached.

The present invention may also have straps, side members, base members, and/or connections color-coded to allow users to more easily assemble the device. The connectors on all embodiments may also be micro hook and loop connectors or other attachment devices.

These and further and other objects and features of the invention are apparent in the disclosure, which includes the above and ongoing written specification, with the drawings.

DETAILED DESCRIPTION OF THE PREFERRED EMBODIMENTS

The present invention is a rigid or collapsible folding stand for a high fidelity amplifier or speaker. In general, the amplifier or speaker has a rear base edge placed on a two or more flexible straps. The amplifier or speaker is then tilted backward until it touches the amplifier or speaker stand at a single point. The rear surface of the amplifier or speaker, supporting legs and one or more lower flexible straps form a triangle that supports the amplifier or speaker. The stand holds the amplifier in an adjustably tilted position that is controlled by the length of the supporting legs and/or flexible straps used.

Figure 1:
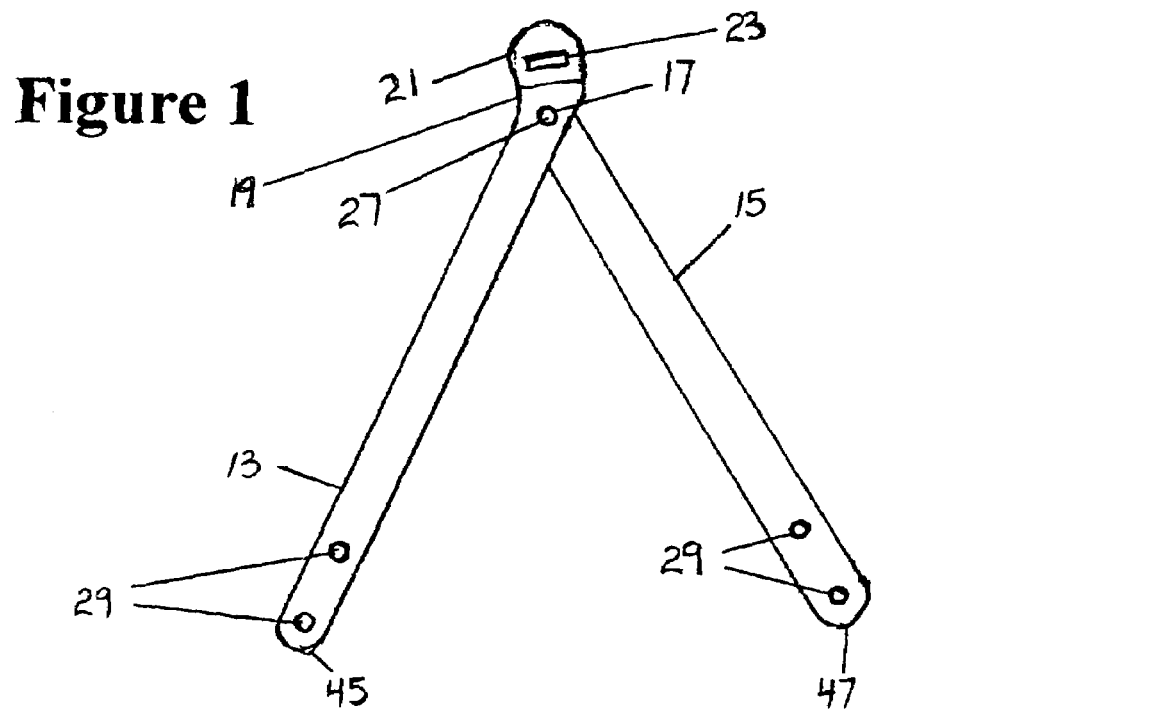
FIG. 1 is a rear view of the two hinged supporting legs.

FIG. 1 shows the first pieces of the amplifier or speaker stand 11. The amplifier or speaker stand includes first 13 and second 15 supporting legs. A hinge 17 connects the first 13 and second 15 supporting legs. The hinge 17 allows the first 13 and second 15 supporting legs to move with respect to one another, around the hinge point and in parallel planes.

An extension 19 is included on either the first 13 or second 15 supporting legs. The extension 19 is covered by a cap 21 that covers all or part of the extension 19. Additionally, a slot 23 is created that passes through the extension 19 and the cap 21. The cap 21 may be made of rubber or a similar substance that protects the surface of an amplifier or speaker 25. The extension 19 also has one or more posts 27 attached on the rear surface of the extension 19. The rear surfaces of all parts face away from the amplifier or speaker 25. Alternatively, the posts 27 may be excluded and the hinge 17 may be extended outward from the rear of the supporting legs 13, 15 to form a post 27. One or more posts 29 are also included at each end 45, 47 of the first 13 and second 15 supporting legs furthest from the hinge 17.

Figure 2:
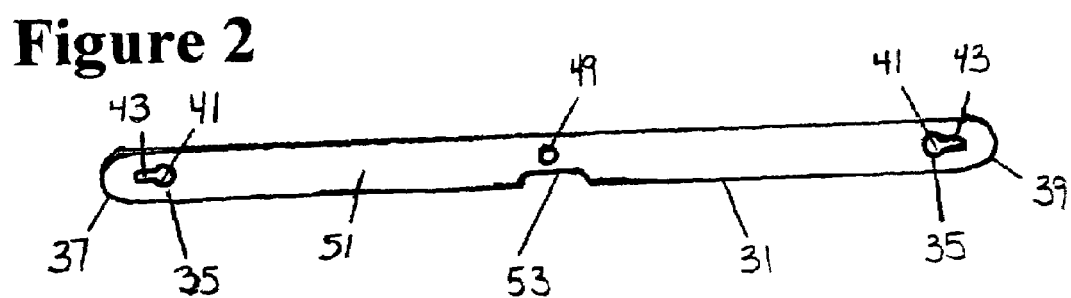
FIG. 2 is a rear view of the horizontal base bar.

FIG. 2 shows the second part of the amplifier or speaker stand 11, a horizontal base bar 31. The horizontal base bar 31 creates a base for the stand 11 along a floor or other surface 33 that holds the amplifier or speaker 25. The horizontal base bar 31 has one or more cutouts 35 on each opposite ends 37, 39 for receiving the posts 29 on the ends of the first 13 and second 15 supporting legs. The cutouts 35 are generally circular 41 in shape with an additional, narrower, protruding cutout 43 that extends toward the ends 37, 39 of the horizontal base bar 31. The posts 29 from the supporting legs 13, 15 pass through the wider circular openings 41 and then lock into the narrower, protruding cutouts 43. The weight of the amplifier or speaker 25 on the supporting legs 13, 15 prevents the posts 29 from leaving the narrower, protruding cutouts 43.

The horizontal base bar 31 also has a post 49 at the center of the rear surface 51. There may also be a cutout 53 underneath the central post 49 to allow a strap to pass under the horizontal base bar 31 before attaching to the central post 49. This allows the horizontal base bar 31 to sit flush with the floor or other surface 33 that the amplifier or speaker 25 is resting on. The notch 53 prevents the amplifier or speaker stand 11 from wobbling and potentially damaging the amplifier or speaker 25.

When the first 13 and second 15 supporting legs and the horizontal base bar 31 are connected, these pieces form a rigid triangular support system. Inserting different posts 29 into different cutouts 35 modifies the size and configuration of the triangular support.

Figure 3:
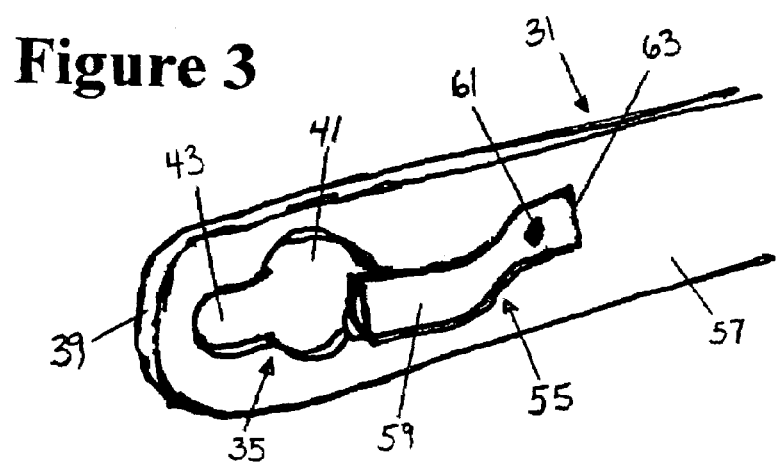
FIG. 3 is a close up of the post lock on the horizontal base bar.

FIG. 3 shows an additional security feature. One or more post locks 55 may be attached to both ends 37, 39 of a front surface 57 of the horizontal base bar 31. The post locks 55 are straps 59 with one or more holes 61 at the end 63 not attached to the front surface 57 of the horizontal base bar 31. The straps 59 may be made of a flexible material. The ends 63 of the post locks 55 are wrapped around the closest end 37, 39 of the horizontal base bar 31 and attach to the posts 29 on the ends of the first 13 or second 15 supporting legs after the posts 29 on the first 13 or second 15 supporting legs pass through the cutouts 35 on the horizontal base bar 31. The post locks 55 further prevent movement of the posts 29 in the cutouts 35 by securing them in the narrower, protruding cutouts 43.

Figure 4:
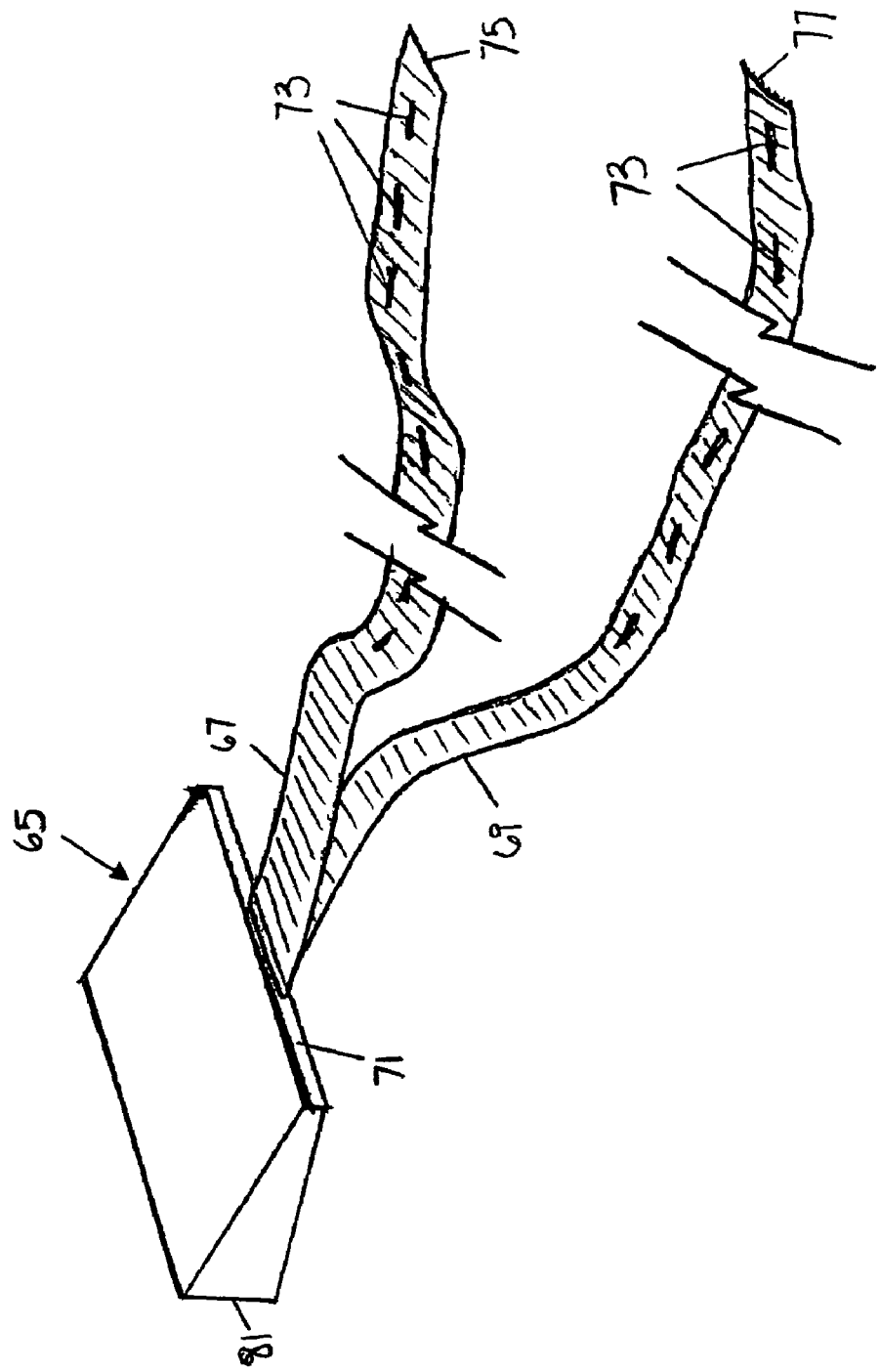
FIG. 4 is a perspective view of the hard foam rubber wedge.

FIG. 4 shows a third part to the amplifier or speaker stand 11. This part is a stop 65. The stop 65 may be made out of hard, foam rubber or a similar substance. The stop 65 may be wedge shaped or cylindrical. If the stop is cylindrical, upper 67 and lower 69 straps wrap around a curved surface of the cylinder. If the stop 65 is a wedge, upper 67 and lower 69 straps extend from the narrow edge 71 of the wedge 65. These straps 67, 69 may be made of a flexible material. One or more holes 73 are created in the ends 75, 77 of the straps 67, 69 not connected to the stop 65. The series of holes 73 makes the system adjustable to various amplifier or speaker 25 dimensions and setup conditions.

Figure 5:
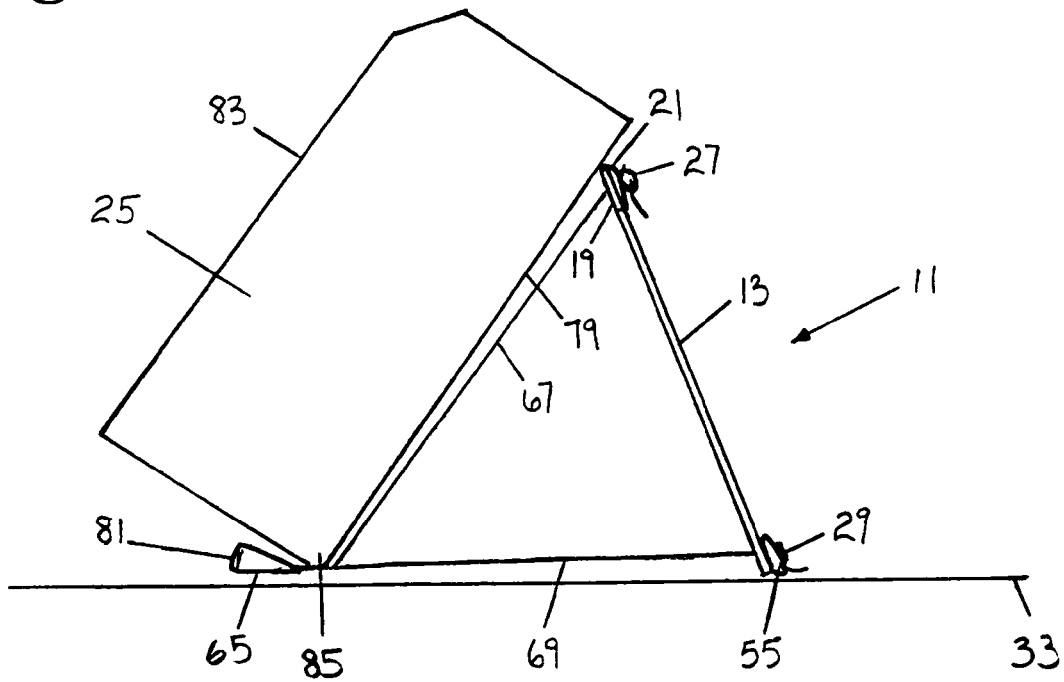
FIG. 5 is a side view of the amplifier or speaker stand with an amp in place.
Figure 6:
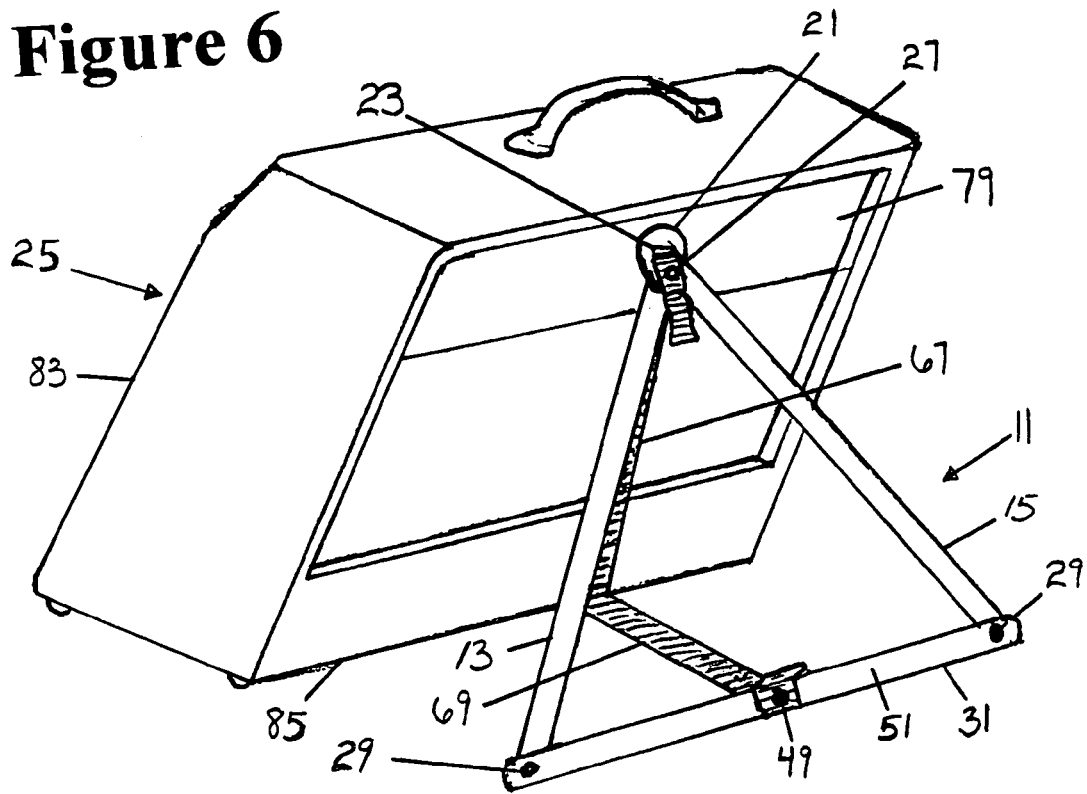
FIG. 6 is a perspective view of the amplifier or speaker stand with an amp in place.

FIGS. 5 and 6 show an assembled amplifier or speaker stand 11. All three pieces of the amplifier or speaker stand 11 work together to provide a stable, collapsible stand. First, the stop 65 and corresponding straps 67, 69 are placed on the floor or other surface 33 that will hold the amplifier or speaker 25. The upper 67 and lower 69 straps are fully extended on the surface 33 toward where a rear surface 79 of the amplifier or speaker 25 will be. Overall, the thickest surface 81 of the stop 65, if it is a wedge, will face in the same direction as a front surface 83 of the amplifier or speaker 25. The amplifier or speaker 25 is then placed on the extended straps 67, 69. A rear base edge 85 of the amplifier or speaker 25 is placed on the straps 67, 69 close to the connection between the stop 65 and the straps 67, 69. The amplifier or speaker 25 is tilted backward to accomplish this.

The supporting legs 13, 15 are then rotated along the hinge 17 until the desired separation between the legs ends 45, 47 is achieved. The legs 13, 15 are then attached to the horizontal base bar 31 and locked into place. The completed rear triangle of the stand 11 is then placed behind the backward tilted amplifier or speaker 25 so that the rubber cap 21 on the extension 19 is touching the rear surface 79 of the amplifier or speaker 25.

Next, the upper strap 67 is passed along the rear surface 79 of the amplifier or speaker 25 and through the slot 23 in the extension 19. The upper strap 67 is then attached to the supporting legs 13, 15 by sliding one of the holes 73 on the strap 67 onto the one or more posts 27 or onto the extended hinge 17. The lower strap 69 is then run along the floor or other surface 33 and under the notch 53 in the horizontal base bar 31. The lower strap 69 is then raised up so that one of the holes 73 on the lower strap 69 fits over the central post 49 on the horizontal base bar 31. This completes the construction of the amplifier or speaker stand 11.

Figure 7:
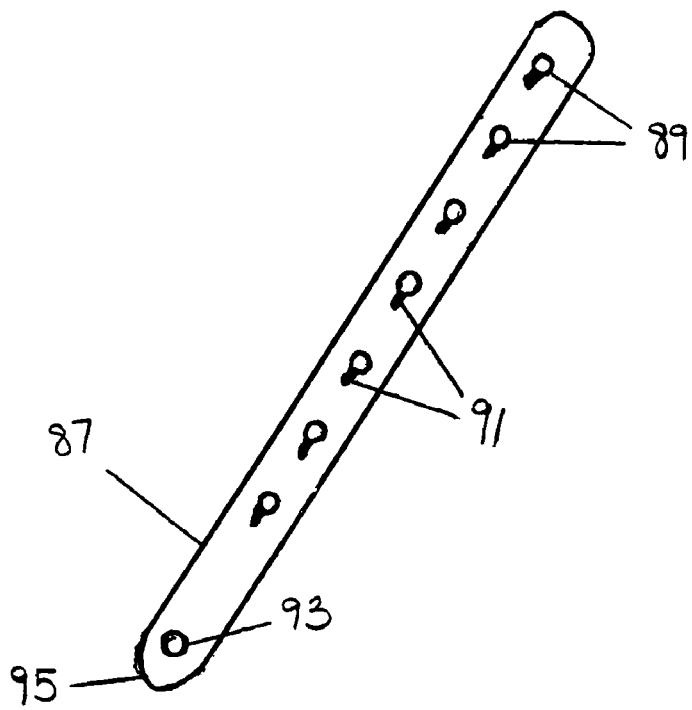
FIG. 7 is a rear view of a supporting leg extender.

FIG. 7 shows leg extensions 87 used with the amplifier or speaker stand 11. In order to further adjust the amplifier or speaker stand 11 for different sized amplifiers or speakers 25 or for various operating conditions, leg extensions 87 for the first 13 and second 15 supporting legs may be used. The leg extensions 87 have one or more cutouts 89 along the length of the leg extensions 87. The cutouts 89 on the leg extensions 87 are similar to those on the horizontal base bar 31. Narrower, protruding cutouts 91 extend away from one or more posts 93 at an end 95 of the leg extensions 87.

Figure 8:
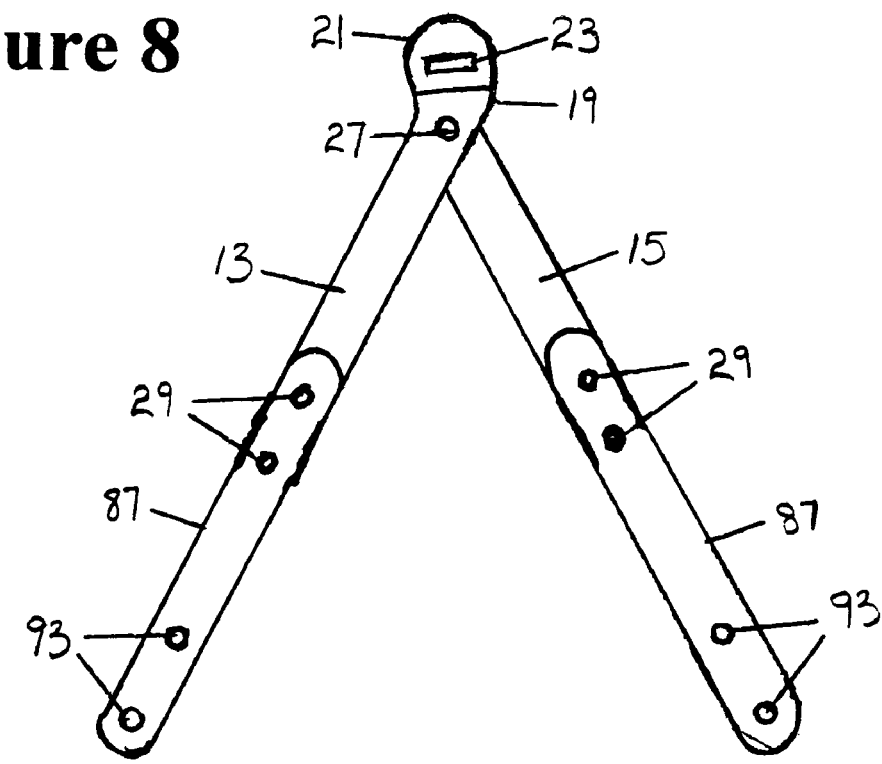
FIG. 8 is a rear view of the two hinged supporting legs with leg extenders installed.

FIG. 8 shows the leg extensions 87 attached to the first 13 and second 15 supporting legs. The leg extensions 87 are attached by passing the one or more end posts 93 on the supporting legs 13, 15 through the cutouts 89 on the leg extensions 87 and locking the posts 29 into the narrower, protruding cutouts 91. The weight of the amplifier or speaker 25 on the leg extensions 87 prevents the posts 29 from leaving the narrower, protruding cutouts 91. Then, the one or more posts 93 on the leg extensions 87 pass through the one or more cutouts 35 on the horizontal base bar 31 and lock into place in a manner similar to the original supporting legs 13, 15 locking into the cutouts 35.

This flexibility allows the amplifier or speaker stand 11 to be adjustable to accommodate a wide range or amplifier or speaker 25 sizes and positions.

Other embodiments for the amplifier or speaker stand of the present invention are possible.

Figure 9:
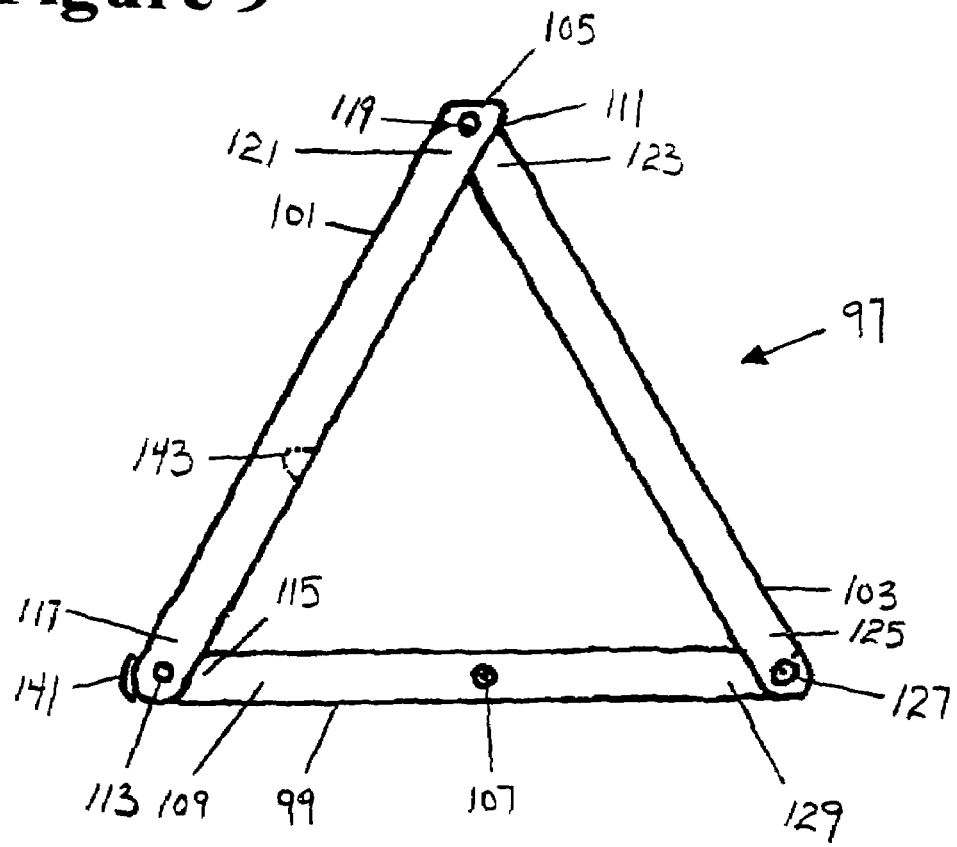
FIG. 9 is a rear view of a folding frame.

FIG. 9 shows an alternative stand arrangement 97. The stand 97 includes a base member 99, and a first 101 and second 103 side members. Strap attachments 105, 107 are found on the center of a rear surface 109 of the base member 99 and on the first 101 or second 103 side member near where the side members connect 111. A hinge 113 on an end 115 of the base member 99 connects the end 115 of the base member 99 to an end 117 of the first side member 101. Another hinge 119 on an opposite end 121 of the first side member 101 connects the opposite end 121 of the first side member 101 to an end 123 of the second side member 103. Finally, a fastener 127 on an opposite end 125 of the second side member 103 connects the opposite end 125 of the second side member 103 to an opposite end 129 of the base member 99.

Figure 10:
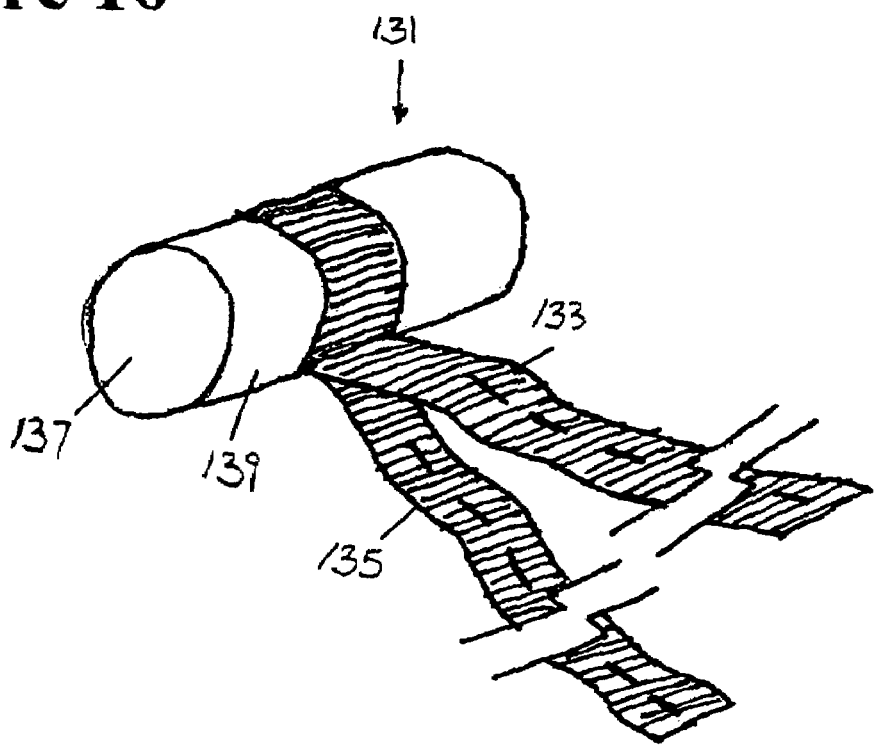
FIG. 10 is an alternative design for the wedge.

FIG. 10 shows a stop 131 in the shape of a cylinder, with ends 137 and a curved surface 139. Similar to the previous embodiments, the stop 131 is used to complete the amplifier or speaker stand. Upper 133 and lower 135 straps extend from the stop 131. The upper strap 133 is connected to the strap attachment 105 on the opposite end 121 of the first side member 101, and the lower strap 135 is connected to the strap attachment 107 in the center of the rear surface 109 of the base member 99.

To use the apparatus, a rear base edge 85 of an amplifier or speaker 25 is placed on the straps 133, 135 in proximity to the stop 131. Then a rear surface 79 of the amplifier or speaker 25 is placed in contact with the hinge 119 between the first 101 and second 103 side members.

This embodiment folds up for easy carrying and storage of the amplifier or speaker stand 97. The base member 99 has a flange 141 for preventing rotation of the first side member 101 during folding in an undesired direction. The first side member 101 may include a notch 143 for receiving the strap attachment 107 on the center of the rear surface 109 of the base member 99 during folding. This allows the base member 99 to fold snug with the first side member 101. The size of the stand 97 is adjustable to accommodate a wide variety of amplifier or speaker 25 sizes and positions.

Figure 11:
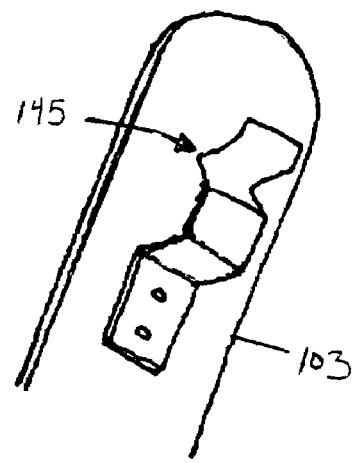
FIG. 11 is a leaf-spring locking mechanism for securing the frame together.
Figure 12:
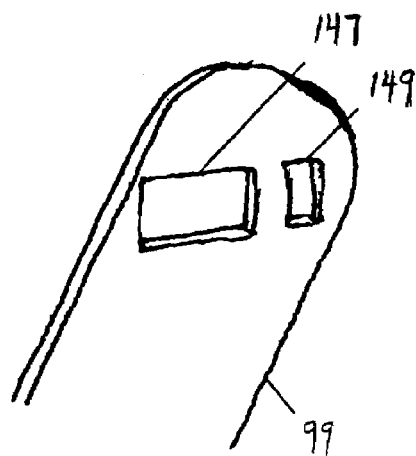
FIG. 12 is a socket for receiving the leaf-spring locking mechanism.

The hinge 119 and the strap attachment 105 on the opposite end 121 of the first side member 101 may be combined into one dual function device. The fastener 127 on an opposite end 125 of the second side member 103 may be a snap, turn button or other attachment device. FIGS. 11 and 12 show an alternative fastener 127. The fastener 127 is a leaf spring mechanism 145 connected to the second side member 103. Corresponding socket holes 147, 149 on the base member 99 receive the leaf spring mechanism 145. The socket holes 147, 149 and leaf spring mechanism 145 may be located on reversed locations.

Figure 13:
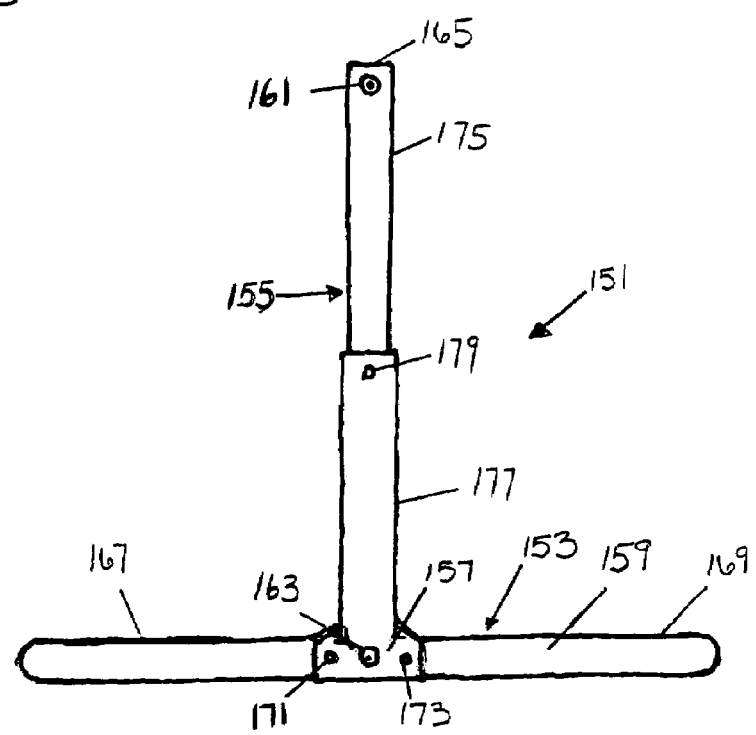
FIG. 13 is a rear view of an inverted t-shaped amplifier or speaker stand.

FIG. 13 shows an alternative embodiment for a stand 151 that includes a base member 153 and a vertical member 155 connected to the center 157 of a rear surface 159 of the base member 153. Strap attachments 161, 163 are placed on the connection 157 between the vertical member 155 and the base member 153 and on a top end 165 of the vertical member 155. Like the previous embodiments, a stop 131 is used to complete the amplifier or speaker stand 151. Upper 133 and lower 135 straps extend from the stop 131. The upper strap 131 is connected to the strap attachment 161 on the opposite end of the vertical member 155, and the lower strap 135 is connected to the strap attachment 163 in the center 157 of the rear surface 159 of the base member 99.

To use the apparatus, a rear base edge 85 of an amplifier or speaker 25 is placed on the straps 133, 135 in proximity to the stop 131. Then a rear surface 79 of the amplifier or speaker 25 is placed in contact with the end 165 of the vertical member 155.

This embodiment folds up for easy carrying and storage of the amplifier or speaker stand 151. The base member 153 may be split into two segments 167, 169 and wherein each segment 167, 169 is connected to the central vertical member 155 by a hinge 171, 173. Each segment 167, 169 of the base member 153 folds up to abut the vertical member 155, thereby forming a highly portable device. The segments of the base member 167, 169 lock into place during carrying and storage.

The vertical member 155 may be adjustable. The vertical member 155 may comprise a smaller first segment 175 movable in relation to a larger second segment 177. The first 175 and second 177 segments are connected together using an adjustable locking mechanism 179.

Figure 14:
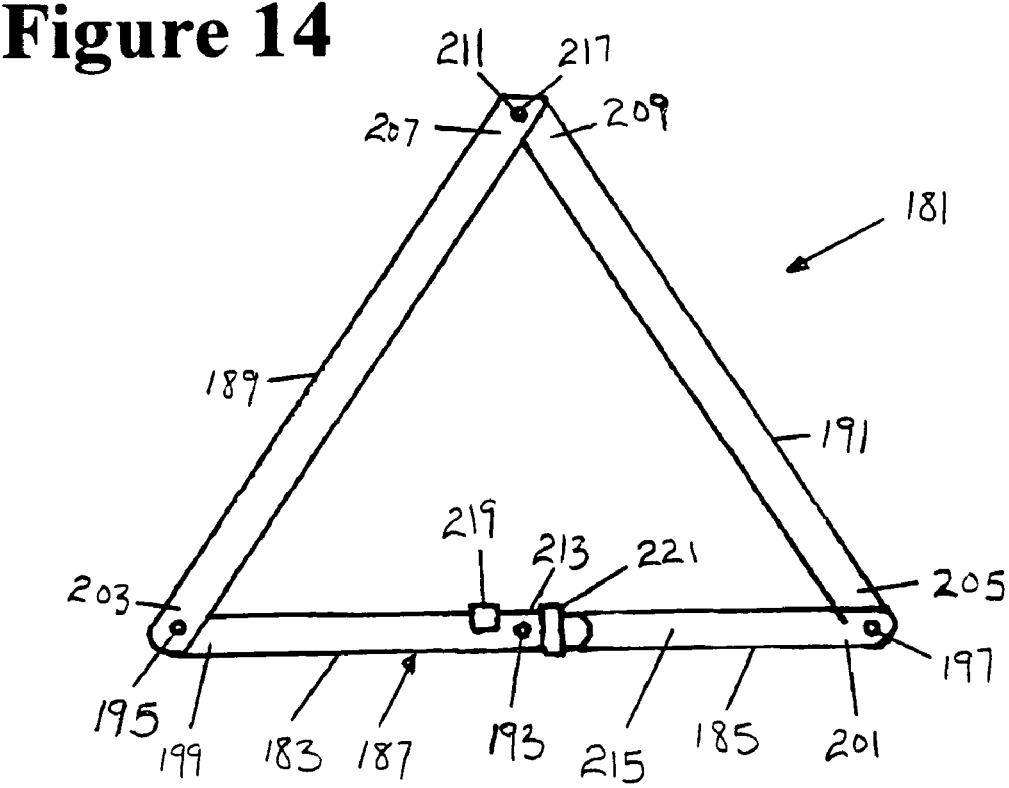
FIG. 14 is a rear view of a collapsible frame in an open position.
Figure 15:
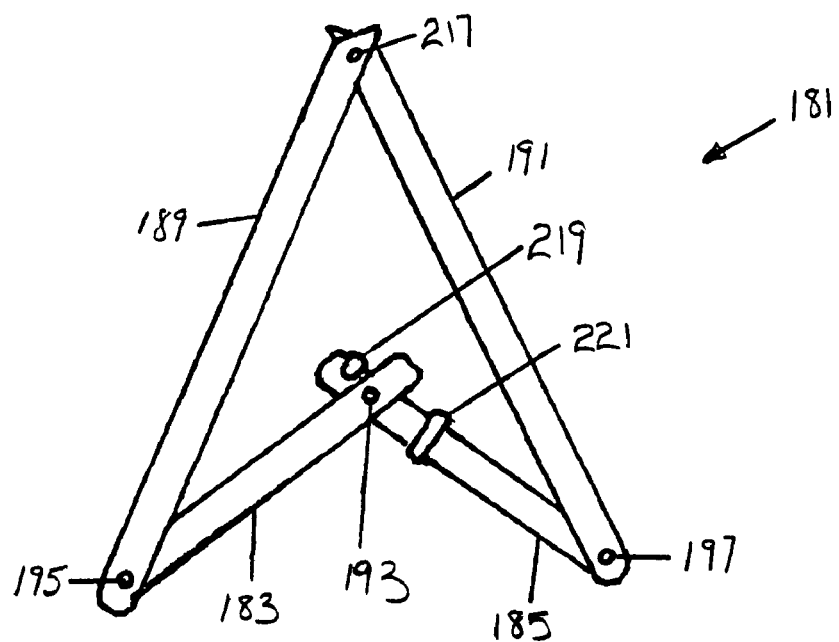
FIG. 15 is a rear view of a collapsible frame in a partially closed position.

FIGS. 14 and 15 show another embodiment of the stand 181 uses first 183 and second 185 segments of a base member 187 and first 189 and second 191 side members. A hinge 193 is provided between the first 183 and second 185 segments of a base member 187 for forming a collapsing hinge. Hinges 195, 197 are also located on ends 199, 201 of the segments 183, 185 of the base member 187 opposite the collapsing hinge 193 for connecting the ends 199, 201 of the base member 187 to ends 203, 205 of the first 189 and second 191 side members. A hinge 217 an opposite end 207 of the first side member 189 connects to an opposite end 209 of the second side member 191 for connecting the first side member 189 to the second side member 191. Strap attachments 211, 213 are located on the rear surface 215 of the base member 187 and on the opposite end 207 of the first side member 189.

Similar to the previous embodiments, a stop 131 is used to complete the amplifier or speaker stand 181. Upper 133 and lower 135 straps extend from the stop 131. The upper strap 133 is connected to the strap attachment 211 on the opposite end 207 of the first side member 189, and the lower strap 135 is connected to the strap attachment 213 in the center of the rear surface 215 of the base member 187.

To use the apparatus, a rear base edge 85 of an amplifier or speaker 25 is placed on the straps 133, 135 in proximity to the stop 131. Then a rear surface 79 of the amplifier or speaker 25 is placed in contact with the ends 207, 209 of the side members 189, 191.

This embodiment has a retainer clip 219 for holding the first 183 and second 185 segments of the base member 187 in a straight line during use. It also has a locking ring 221 for securing the first 183 and second 185 segments of the base member in a straight line by surrounding the first 183 and second 185 segments and holding them together. When use of the stand 181 is completed, the collapsing hinge 193 is pushed upward, folding the segments 183, 185 of the base member 187 under the side members 189, 191.

The hinges 193, 217 and strap attachments 211, 213 may be combined into dual function devices. The stand 181 dimensions are adjustable to accommodate a wide range or amplifier or speaker 25 sizes and positions.

Figure 16:
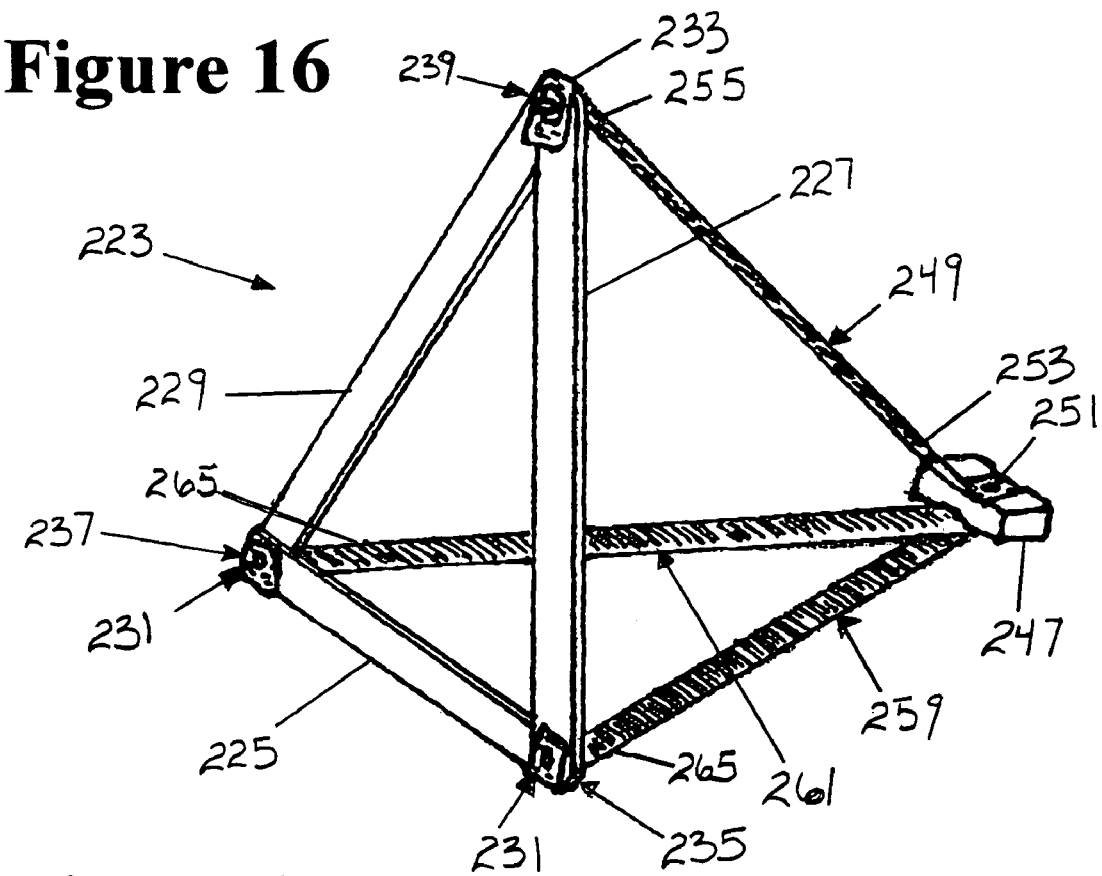
FIG. 16 is a perspective view of a turn button fastener in a locked position.
Figure 17:
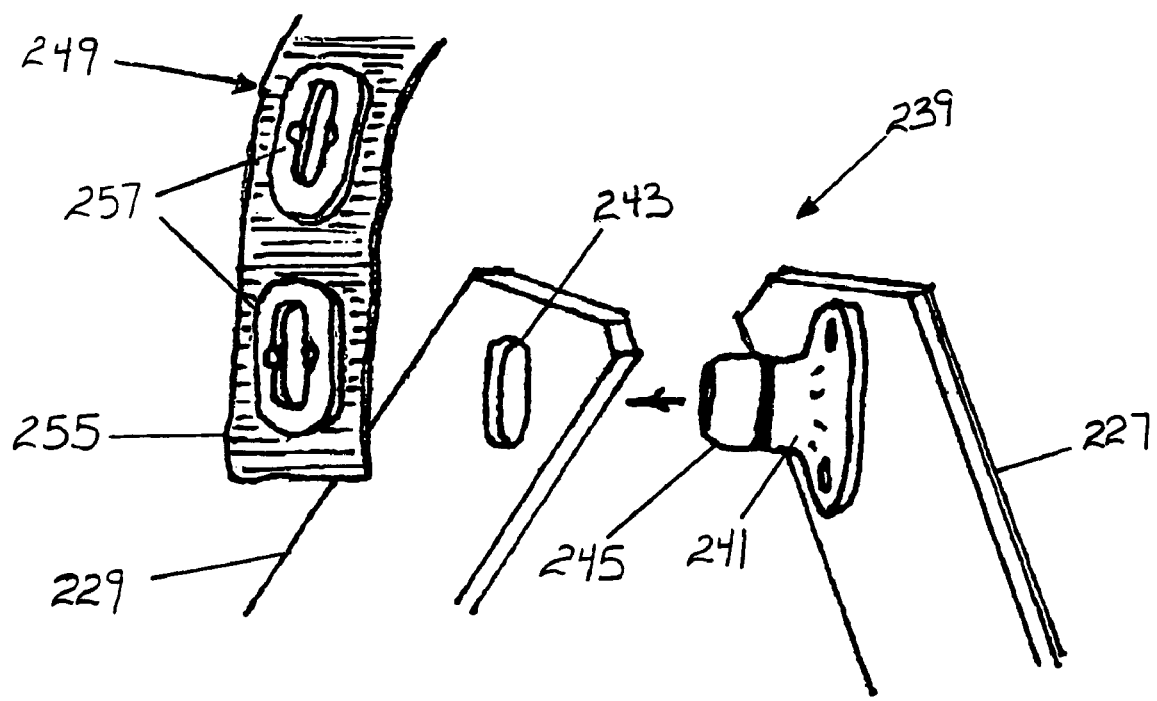
FIG. 17 is a detail of the turn button connection.

FIGS. 16 and 17 show an alternative embodiment. A stand 223 can include a base member 225 and a first and second side members 227, 229. Strap attachments in the form of a snap 231 are found on either end of the base member 225 and on the connection 233 between the first and second side member at the attachment point. First and second hinges 235, 237 on either end of the base member 225 connect the ends of the base member 225 to a lower end of the first side member 227 and the second side member 229. The first and second hinges 235, 237 allow for the first side member 227 to rotate in front of the base member 225 and the second side member 229 to rotate behind the base member 225. The first and second hinges 235, 237 also act as snap attachments. A turn button fastener device 239 is located on the upper ends of the first and second side members 227, 229. The turn button fastener has a pass-through extension 241 on the side member closest to the amplifier or speaker and a pass-through opening 243 on the side member furthest from the amplifier or speaker. The pass through extension 241 has a turn button 245 on the end that rotates after the extension 241 is passed through the opening 243 to secure the stand 223 in a locked position.

Similar to the previous embodiments, a stop 247 is used to complete the amplifier or speaker stand 223. The stop 247 may be made of foam or any other material. An upper strap 249 extends from the top of the stop 247. The upper strap 249 is riveted or otherwise attached 251 to the stop 247 at one end 253. The opposite end 255 has one or more eyelets 257 corresponding in size to the pass-through opening 243. The pass-through extension 241 also passes through the eyelet 257 before the turn button 245 is secured. The eyelets 257 are preferably, but not limited to metal eyelets. Multiple eyelets 257 allow for adjustment of the upper strap 249 to accommodate different sized amplifiers or speakers and angles of amplifiers or speakers.

Two lower straps 259, 261, or one folded strap, extend from the stop 247. The straps are preferably, but not limited to, flexible or polypropylene straps. One strap or one half of a strap 259 is place over the other strap or half of a strap 261 before being riveted or otherwise attached to the stop 247. The same rivet or attachment 251 may connect both the lower straps 259, 261 and the upper strap 249 to the stop 247. One lower strap 259 extends to the snap hinge device 235 connecting the first side member 227 to the base member 225. A snap 231 on the free end 265 of the lower strap 261 connects to a complementary snap on the hinge. The other lower strap 259 extends to the snap hinge device connecting the second side member 229 to the base member 225. A snap 231 on the free end 265 of this lower strap 259 connects to a complementary snap on the hinge.

To use the apparatus, a rear base edge of an amplifier or speaker is placed on the straps 259, 261 in proximity to the stop 247. Then a rear surface of the amplifier or speaker is placed in contact with the connection area of the first and second side members. This embodiment folds up for easy carrying and storage of the amplifier or speaker stand.

In another embodiment, the triangular shape created by a base member and first and second side members may be fixed. The amplifier or speaker stand is still portable and easy to use. One or more straps connect a stop to the triangular shape. The straps may be removed during transport to create a compact device or they may be left attached.

The present invention may also have straps, side members, base members, and/or connections color-coded to allow users to more easily assemble the device. The connectors on all embodiments may also be micro hook and loop connectors or other attachment devices.

While the invention has been described with reference to specific embodiments, modifications and variations of the invention may be constructed without departing from the scope of the invention.

The invention claimed is:

1. Speaker or amplifier cabinet support apparatus comprising: rigid base and upright members connected to each other, a block for positioning beneath a lower surface of the cabinet, and straps connected between the block and the rigid base and upright members for leaning the cabinet backward around a lower rear edge of the cabinet and supporting a back of the cabinet, wherein tops of the upright members are joined by complementary connectors, and bottoms of the upright members are connected by fasteners at ends of the base member.

2. The apparatus of claim 1, wherein the rigid base and upright members comprise a base member and two upright members joined together with hinge connectors at the base member and at bottoms of the upright members, and wherein tops of the upright members are joined by a fastener at the tops of the upright members.

3. The apparatus of claim 2, wherein the straps comprise three straps connected to the block, and wherein a first strap is connected to the tops of the upright members, and wherein two other straps are connected near ends of the base member.

4. The apparatus of claim 3, wherein the first strap is connected to a fastener at the tops of the upright members, and wherein the two other straps are connected to fasteners near the hinge connectors at the base member and at the bottoms of the upright members.

5. The apparatus of claim 1, wherein the base and upright members are connected in a triangular form, and wherein the ends of the straps are connected to corners of the triangular form.

6. The apparatus of claim 1, wherein the base and upright members are connected in a triangular form, and wherein the ends of the straps are connected to tops of the upright members and to a center of the base member.

7. The apparatus of claim 1, wherein the base and upright members are connected in triangular form by hinge pin connectors, and wherein the base member comprises two members centrally hinged for folding along the upright members.

8. The apparatus of claim 1, wherein the upright members are extensible.

9. The apparatus of claim 1, wherein the base member comprises first and second base elements centrally hinged, and the upright member comprises a post joined to the base elements.

10. A method of supporting a speaker or amplifier cabinet comprising:
providing rigid base and upright members,
connecting the rigid base and upright members to each other,
providing a block for positioning under a lower surface of the cabinet,
providing straps, and
connecting the straps to the block and to the base and upright members, and
leaning the cabinet rearward, and supporting the cabinet in a rearward tipped position.

11. The method of claim 10, further comprising joining the rigid base and upright members together with hinge connectors at the base member and at bottoms of the upright members, and further comprising joining tops of the upright members by a fastener at the tops of the upright members.

12. The method of claim 11, wherein the providing of the straps comprises providing three straps connected to the block, and wherein the connecting of the straps further comprises connecting an upper strap to the tops of the upright members and further comprises connecting two other straps near ends of the base member.

13. The method of claim 12, wherein the upper strap is connected to a fastener near the tops of the upright members and wherein the two other straps are connected to the connectors at the base member and at the bottoms of the upright members.

14. The method of claim 10, further comprising connecting the base and upright members in a triangular form, and further comprising connecting the ends of the straps to corners of the triangular form.

15. The method of claim 10, further comprising connecting the base and upright members in a triangular form, and further comprising connecting the ends of the straps to tops of the upright members and to a center of the base member.

16. The method of claim 10, wherein tops of the upright members are joined by a connector, and bottoms of the upright members are hinged at ends of the base member.

17. The method of claim 10, wherein the base and upright members are connected in triangular form by connectors.

18. A stand apparatus for supporting a speaker or amplifier cabinet, tipped backward about a lower rear edge of the cabinet, comprising:
a base having first and second opposite ends,
first and second hinge connectors, respectively, at the first and second ends,
first and second side members having upper and lower ends, the lower ends being connected to first and second hinge connectors for rotating the side members with respect to the base, a fastener projecting from the upper end of the first side member, a receiver in the upper end of the second side member for receiving the fastener and for retaining the second side member connected to the fastener, a block for placing under the cabinet, and first, second and third straps connected to the block, the first and second straps having free ends remote from the block connected near junctions of the base and the first and second side members, respectively, and a free end on the third strap having a receiver for connecting to a complementary fastener at the upper ends of the side members.

19. The apparatus of claim 18, wherein free ends of the straps have multiple connectors for connecting to the base and side members and for controlling rearward leaning of the cabinet for different angles and for different cabinets.

* * * * *